US009751107B2

(12) United States Patent
Decker et al.

(10) Patent No.: US 9,751,107 B2
(45) Date of Patent: Sep. 5, 2017

(54) TWO-COAT SINGLE CURE POWDER COATING

(71) Applicant: Valspar Sourcing, Inc., Minneapolis, MN (US)

(72) Inventors: Owen H. Decker, Smithville, MO (US); Thomas E. Reno, Americus, GA (US); Robert D. Breitzman, Ramsey, MN (US); Carlos A Concha, New Brighton, MN (US); Jeffrey D. Rogozinski, Blaine, MN (US); Keith M. Kirkwood, Apple Valley, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 14/522,143

(22) Filed: Oct. 23, 2014

(65) Prior Publication Data

US 2015/0044476 A1   Feb. 12, 2015

Related U.S. Application Data

(63) Continuation-in-part of application No. 14/019,041, filed on Sep. 5, 2013, which is a continuation-in-part of application No. PCT/US2012/070347, filed on Dec. 18, 2012.

(60) Provisional application No. 61/642,578, filed on May 4, 2012, provisional application No. 61/613,647, filed on Mar. 21, 2012.

(51) Int. Cl.

| | |
|---|---|
| *B05D 1/38* | (2006.01) |
| *B05D 7/00* | (2006.01) |
| *B05D 1/12* | (2006.01) |
| *B05D 1/36* | (2006.01) |
| *B05D 3/12* | (2006.01) |
| *B05D 3/10* | (2006.01) |
| *B05D 3/00* | (2006.01) |
| *B05D 3/02* | (2006.01) |
| *B05D 7/14* | (2006.01) |
| *C09D 163/00* | (2006.01) |
| *C08K 3/22* | (2006.01) |
| *C08K 5/32* | (2006.01) |
| *C08K 5/3445* | (2006.01) |
| *C08K 5/29* | (2006.01) |
| *C09D 5/03* | (2006.01) |
| *C23C 24/00* | (2006.01) |
| *C23C 26/00* | (2006.01) |
| *C23C 28/00* | (2006.01) |

(52) U.S. Cl.
CPC .............. *B05D 7/542* (2013.01); *B05D 1/12* (2013.01); *B05D 1/36* (2013.01); *B05D 3/002* (2013.01); *B05D 3/0218* (2013.01); *B05D 3/0254* (2013.01); *B05D 3/102* (2013.01); *B05D 3/12* (2013.01); *B05D 7/14* (2013.01); *C08K 3/22* (2013.01); *C08K 5/29* (2013.01); *C08K 5/32* (2013.01); *C08K 5/3445* (2013.01); *C09D 5/03* (2013.01); *C09D 5/035* (2013.01); *C09D 163/00* (2013.01); *C23C 24/00* (2013.01); *C23C 26/00* (2013.01); *C23C 28/00* (2013.01); *C08K 2003/2241* (2013.01); *Y10T 428/31529* (2015.04)

(58) Field of Classification Search
CPC ..................................................... B05D 7/542
USPC ......................................................... 427/195
See application file for complete search history.

(56) References Cited

U.S. PATENT DOCUMENTS

| | | |
|---|---|---|
| 3,117,113 A | 1/1964 | Tudor |
| 3,919,345 A | 11/1975 | Labana et al. |
| 4,345,004 A | 8/1982 | Miyata et al. |
| 4,582,863 A | 4/1986 | Wessling |
| 5,021,473 A | 6/1991 | Macholdt et al. |
| 5,212,245 A | 5/1993 | Franks |
| 5,380,804 A | 1/1995 | Lees et al. |
| 5,651,872 A | 7/1997 | Takeuchi et al. |
| 5,830,529 A | 11/1998 | Ross |
| 5,872,163 A | 2/1999 | Hollstein et al. |
| 6,051,641 A | 4/2000 | Howard |
| 6,075,099 A | 6/2000 | Stark |
| 6,184,279 B1 | 2/2001 | Anderson |
| 6,238,750 B1 | 5/2001 | Correll et al. |
| 6,276,400 B1 | 8/2001 | Jackson et al. |
| 6,414,103 B1 | 7/2002 | Correll et al. |
| 6,548,109 B1 | 4/2003 | Hagquist et al. |
| 6,602,582 B2 | 8/2003 | Winterowd |

(Continued)

FOREIGN PATENT DOCUMENTS

| | | |
|---|---|---|
| CN | 101128267 A | 2/2008 |
| EP | 2153911 A1 | 2/2010 |

(Continued)

OTHER PUBLICATIONS

Johansson et al, "On the Synthesis and Characterization of New Low Temperature Curing Powder Coatings Cured With Radiation", Journal of Coatings Technology, vol. 70, No. 884, Sep. 1998 (6 pages).

Kenny et al, "Analytical Approach for High Quality Appearance Powder Coatings", Journal of Coatings Technology, vol. 68, No. 855, Apr. 1996 (9 pages).

Uhlmann et al, "Influence of Additives on Interfacial Phenomena During Film Formation of Powder Coatings", Journal of Coatings Technology, vol. 73, No. 915, Apr. 2001 (7 pages).

International Search Report for International Application No. PCT/US2012/070347, dated Apr. 12, 2013 (4 pages).

International Preliminary Report on Patentability issued Sep. 23, 2014 for International Application No. PCT/US2013/030506 (8 pgs).

*Primary Examiner* — Alexander Weddle

(57) ABSTRACT

Methods and systems for coating metal substrates are provided. The methods and systems include sequential application of low flow and high flow powder coatings followed by a single heating step to provide a cured coating. The methods and systems include a marker that allows coating uniformity to be monitored and assessed during application. The described methods provide coatings with optimal surface smoothness and edge coverage.

17 Claims, No Drawings

(56) References Cited

U.S. PATENT DOCUMENTS

| | | |
|---|---|---|
| 6,641,710 B2 | 11/2003 | Sakura et al. |
| 6,743,379 B2 | 6/2004 | Gottschling et al. |
| 6,875,479 B2 | 4/2005 | Jung et al. |
| 7,041,340 B2 | 5/2006 | Kittle et al. |
| 7,507,440 B2 | 3/2009 | Reising et al. |
| 2001/0020060 A1 | 9/2001 | Lucarelli et al. |
| 2003/0026993 A1* | 2/2003 | Agawa et al. ............ 428/413 |
| 2003/0194554 A1 | 10/2003 | Petersen et al. |
| 2004/0185259 A1 | 9/2004 | Nicholl et al. |
| 2005/0119437 A1 | 6/2005 | Wenning et al. |
| 2005/0132930 A1* | 6/2005 | Schlegel ............ 106/415 |
| 2006/0156948 A1* | 7/2006 | Hendriks et al. ........ 106/15.05 |
| 2006/0225612 A1 | 10/2006 | Lejeune et al. |
| 2006/0264548 A1 | 11/2006 | Liu et al. |
| 2008/0171145 A1 | 7/2008 | Stants et al. |
| 2008/0289968 A1 | 11/2008 | Menovcik et al. |
| 2009/0130304 A1 | 5/2009 | Muth et al. |
| 2009/0192247 A1 | 7/2009 | Daly |
| 2010/0028582 A1 | 2/2010 | Joch et al. |
| 2010/0227141 A1 | 9/2010 | Morales |
| 2010/0266782 A1* | 10/2010 | Langlois ............ 427/521 |
| 2010/0297422 A1* | 11/2010 | Lucas ............ C08G 59/621 |
| | | 428/301.1 |
| 2011/0300294 A1* | 12/2011 | Nachtman et al. ........ 427/189 |
| 2014/0011040 A1 | 1/2014 | Decker et al. |
| 2015/0004309 A1 | 1/2015 | Reno et al. |

FOREIGN PATENT DOCUMENTS

| | | |
|---|---|---|
| JP | 51101045 A | 9/1976 |
| JP | H04-161466 A | 6/1992 |
| JP | 06256692 | 9/1994 |
| JP | H09-075837 A | 3/1997 |
| JP | 10257727 | 9/1998 |
| JP | 10-265714 A | 10/1998 |
| JP | 3848734 B2 | 12/1998 |
| JP | 10329269 | 12/1998 |
| JP | 11156292 | 6/1999 |
| JP | 11300271 | 11/1999 |
| JP | 2003-292881 A | 4/2002 |
| WO | 0058389 | 10/2000 |
| WO | 2011134986 A1 | 11/2011 |

* cited by examiner

TWO-COAT SINGLE CURE POWDER COATING

CROSS-REFERENCE TO RELATED APPLICATION(S)

This application is a continuation-in-part of U.S. application Ser. No. 14/019,041, filed 5 Sep. 2013, which is a continuation-in-part of PCT/US/2012/070347, filed 18 Dec. 2012, which claims priority from U.S. Provisional Application Ser. No. 61/642,578, filed 4 May 2012 and U.S. Provisional Application Ser. No. 61/613,647, filed 21 Mar. 2012.

BACKGROUND

Powder coatings are solvent-free, 100% solids coating systems that have been used as low VOC alternatives to traditional liquid coatings and paints.

Powder coating of metal parts is a common practice. It is difficult, however, to coat certain parts of a metal substrate, including edges and corners, for example, to obtain a uniform coating using typical powder coating processes. Consequently, edge corrosion is a common problem. Typically, when powder coatings are applied to metal parts, a low-flow coating which provides good edge coverage is used. However, such coatings have a tendency to produce wavy surfaces characterized as orange peel, or surfaces with raised grains, i.e. surfaces with low smoothness. On the other hand, when flow is increased to provide greater smoothness, edge coverage thins, and may fail altogether; leaving metal parts prone to edge corrosion. Conventional systems that attempt to combine flow characteristics with increased surface smoothness typically require multiple application and heating steps, leading to process inefficiency and delay.

From the foregoing, it will be appreciated that there is a need for effective powder coating of metal parts, where multiple cure cycles are eliminated, and where the coating demonstrates excellent performance characteristics, such as excellent corrosion protection, including at the edges, and optimal surface smoothness.

SUMMARY

The invention described herein includes methods for coating metal substrates using one or more powder compositions. In an embodiment, the methods include providing a metal substrate and applying a first powder coating on the substrate, where the first powder coating has flow of no more than about 40 mm. A second powder coating is then applied on the first powder coating, where the second powder coating has flow of at least about 40 mm. The two coatings are then heated in a single step to produce a coating with good corrosion resistance, including at the edges, and surface smoothness.

In another embodiment, the present invention includes systems for coating a metal substrate. The system includes a first powder composition with flow of no more than about 40 mm, and a second powder composition with flow of at least about 40 mm. When the first and second powder compositions are sequentially applied to the metal substrate and heated in a single step, the resultant cured coating has optimal corrosion resistance and surface smoothness.

In another embodiment, the present invention includes methods for coating a metal substrate, where the methods include providing at least a first powder composition with flow of no more than about 40 mm, and optionally, providing at least a second powder composition with flow of at least about 40 mm. The methods further include instructions for coating a metal substrate with at least the first composition, followed by coating with a second composition, and, in a single step, heating the two compositions to form a cured coating.

In yet another embodiment, the present invention includes methods and systems for coating a metal substrate, where the methods and systems include providing at least a first powder composition, which includes a marker, and optionally, providing at least a second powder composition. The methods or systems include instructions for coating a metal substrate with at least a first coating, wherein the presence of the marker in the first powder composition allows monitoring of the application of the second powder composition. The details of one or more embodiments and aspects of the invention are set forth below. Other features, objects, and advantages of the invention will be apparent from the description and from the claims.

Selected Definitions

Unless otherwise specified, the following terms as used herein have the meanings provided below.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate. Additionally, the term "metal substrate," as used herein refers to substrates that are untreated, unprimed, or clean-blasted, and also to surfaces that have been primed or pretreated by various methods known to those of skill in the art.

As used herein, the term "flow" refers to the relative flow-out of a powder composition on heating. Flow may be measured according to the procedure described in ASTM Method D4242-07 (2013) (Test Method for Inclined Plate Flow for Thermosetting Coating Powders).

The term "smoothness", as used herein, refers to the specular gloss or light reflectance from a powder-coated surface. It is typically obtained by comparing the specular reflectance from a coated sample to the specular reflectance from a black glass standard. As used herein, smoothness may be expressed by any means known to those of skill in the powder coating art, including visual standards developed by the Powder Coating Institute (PCI Technical Brief No. 20). Under this standard, a visual scale of ten powder-coated panels, graded from 1 (high roughness/orange peel) to 10 (very smooth, high gloss finish) is used. To determine relative smoothness, a powder-coated sample is visually compared with the standard panels, and a smoothness grade is assigned by judging which standard panel is closest to the sample.

In the alternative, surface smoothness may be expressed as 20-degree or 60-degree gloss measured using ASTM Method D523-14 (Standard Test Method for Specular Gloss).

Additionally, smoothness may be assessed by monitoring the distinctness of the image (DOI), where the reflection of a powder-coated sample in each of the 10 PCI test panels is photographed, and the speed of a beam of light reflected from the surface is measured by a special instrument. Surfaces that reflect an image perfectly have DOI value of 100, while surfaces with little or no image clarity have DOI value of 0. The method 30 used to determine smoothness will typically depend on the ultimate end use for the powder-coated substrate.

The term "curing," as used herein, refers to a step of heating a powder composition to a temperature at which it begins to melt and flow. The viscosity of the coating composition increases with temperature, as crosslinking increases.

As used herein, the term "edge coverage" refers to the degree to which a powder coating covers the edges or corners of a substrate. It is measured using the procedure described in ASTM Method D2967-7 (2013) (Standard Test Method for Corner Coverage of Powder Coatings), modified by spraying the substrate (a square test bar) with the powder coating composition rather than dipping the substrate in a fluidized bed. Edge coverage is the ratio of the thickness of the coating at the edges of the test bar to the thickness of the coating on the face of the test bar, expressed as a percentage, where the face coverage refers to the thickness of the coating applied to each of the planar surfaces of the test bar. The term "edge coverage" is used interchangeably with the term "corner coverage." Edge coverage is typically validated by cabinet corrosion testing.

The term "marker," as used herein, refers to any chemical or physical entity or component that can be included in a powder coating composition and detected by physical or chemical means during powder application to a substrate. Physical means of detection include viewing with the naked eye, under specific illumination conditions, with specialized viewing equipment or eyewear, and the like. Chemical means of detection include chemical reaction of the marker with other components in the powder coating that can produce a visible or detectable change in the coating, typically a change in color.

The term "color change," as used herein, refers to a color difference between the powder composition as applied and the color of the coating after the single heating step, wherein the difference in color is assessed using the L*a*b*scale.

The term "critical color match," as used herein, refers to a color similarity between the color of an uncoated substrate and a subsequently applied coating, or a first coating applied to a substrate and a subsequently applied coating, wherein the similarity in color is assessed using the L*a*b*scale.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably", refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.).

Furthermore, disclosure of a range includes disclosure of all subranges included within the broader range (e.g., 1 to 5 discloses 1 to 4, 1.5 to 4.5, 1 to 2, etc.).

DETAILED DESCRIPTION

Embodiments of the invention described herein include methods and systems for powder coating a metal substrate, including at the edges. The methods include steps for applying at least a first powder composition to a substrate, and applying at least a second powder composition over the first composition. The methods further include heating the first and second powder compositions in a single step to obtain a coated article with acceptable, preferably optimal edge coverage and smoothness.

Accordingly, in some embodiments, the present invention provides methods or systems for coating a substrate, including at the edges, with a process that uses a single 20 heating step. Multiple application and heating cycles are thereby eliminated, resulting in a more efficient process. Moreover, as the methods described herein provide optimal protection for the edges of substrates, mechanical methods to round off edges prior to coating are no longer necessary. Therefore, the methods described herein reduce the time, energy and cost of powder coating a substrate, including at the edges, without comprising corrosion resistance or surface smoothness of the coating.

In an embodiment, the methods described herein include applying at least a first powder composition to a substrate, such as a substrate with sharp edges, for example. The first powder composition is a fusible composition that melts on application of heat to form a coating film. The powder is applied using methods known to those of skill in the art, 30 such as, for example, electrostatic spray methods, to a film thickness of about 10 to about 100 microns, preferably 25 to 75 microns. In an aspect, the first powder composition is applied to either the clean (i.e. unprimed) or pretreated surface of a metal substrate, i.e. the first powder composition may be applied to a metal surface that is unprimed, primed, that has been clean-blasted, or a surface that has been pretreated by various methods known to those of skill in the art.

In an embodiment, the method described herein includes applying at least a second powder composition to a substrate after at least a first powder composition has been applied. In an aspect, the second powder composition is a fusible composition that melts on application of heat to form a coating film, and may have the same chemical composition as the first composition (i.e. the composition includes the same binder resin as the first composition, but different additives, pigments, and the like), or it may be different (i.e. the composition includes a different binder resin than the first composition). The second powder composition is applied using methods known to those of skill in the art, such as, for example, electrostatic spray methods. The second powder composition is preferably applied over a coating of the first powder composition, to a film build of 10 to 100 microns, preferably 25 to 75 microns. The total thickness of the film formed by the first and second powder compositions may be about 20 to 200, preferably 50 to 150 microns (approx. 3.0 to 6.0 mil).

On heating, the particles of the first and second powder composition melt and flow out to form the ultimate coating. Without limiting to theory, particles of the first powder composition melt to a low flow liquid that remains where deposited including on the edges of the substrate and forms the metal interface. Similarly, particles of the second powder composition, deposited on the first composition, melt to a high flow liquid that levels out over the surface of the first composition to form a smooth coating and forms the air interface.

It is desirable to apply the first and second coating compositions at the same film build. However, without limiting to theory, it is believed that pretreatment or the presence of dirt, organic residues, and the like on a substrate surface produce an uneven surface. Therefore, the first coating composition is applied at a greater thickness that the second coating composition to account for the altered profile of the substrate. For example, where a total film build of 90 micron (approx. 3.5 mil) is desired, the first coating composition is applied at a film build of about 50 micron to account for the substrate profile, and the second coating composition is applied at a film build of 40 micron.

In an embodiment, the methods described herein include applying at least a second powder composition after at least a first powder composition has been applied on the metal substrate. In an aspect, the second powder composition is applied such that a uniform coating of the second powder composition will substantially cover the entire first coating, i.e., leave little to no part of the first composition exposed. Accordingly, in a preferred aspect, the first powder composition includes a marker visible during the application process, wherein the regularity or uniformity of the second powder coating may be assessed by monitoring the marker during application. For example, where the marker is a uv-sensitive component, the substrate with the first powder already applied may be illuminated with a black light. When the second powder coating is applied over the first, the illuminated marker will identify any parts of the first coating that remain exposed and thereby alert the applicator that the second powder coating needs reapplication or reinforcement. Alternatively, the marker may be included in the second coating composition, such that when the second powder composition is applied, the illuminated marker will identify areas where the first coating is still exposed.

In an embodiment, the methods described herein include applying at least a second powder composition after at least a first powder composition has been applied on the metal substrate. In an aspect, the second powder composition is applied such that a uniform coating of the second powder composition will substantially cover the entire first coating, i.e. leave little to no part of the first composition exposed. Accordingly, in an aspect, the second powder composition changes color during the cure process, and the regularity or uniformity of the second powder coating may be assessed by monitoring the color change of the composition after the single heating step. For example, when the second powder composition is applied over the first, the change in color of the coating when cured will identify any parts of the first coating that remain exposed and thereby alert the applicator that the second powder coating needs reapplication or reinforcement.

The first or second powder compositions may optionally be colored with dyes or pigments. Various organic or inorganic coloring pigments may be used in the present invention. Suitable coloring pigments include titanium dioxide ($TiO_2$), carbon black, red iron oxide, yellow iron oxide, raw umber, phthalocyanine blue, phthalocyanine green, naphthol red, toluidine red, various organic yellows, various organic reds, carbazole violet, DPP reds, DPP yellows, and quinacridones. If desired, processed coloring pigments, such as pigments that have been coated with polymeric materials may be used. Suitable such pigments include SURPASS products from Sun Chemical.

In an embodiment, the first and/or second powder composition(s) include(s) one or more pigments that are a first color when applied, and change to a second (different) color on curing. Suitable pigments of this type include pigments that undergo large permanent color change on exposure to the typical cure temperatures of the powder compositions described herein, about 110° C. to 250° C., preferably 120° C. to 200° C. Examples of such pigments include, without limitation, Hansa Red GG 12-5000 (Clariant), Novaperm Red HF3S 70 (Clariant), and the like.

In another embodiment, the second powder composition includes one or more pigments that are critically color-matched to the first powder composition. Such compositions include pigments conventionally included in powder composition, such as White R-900 (duPont), Sicopal Yellow L1100 (BASF), Colortherm 10 (Lanxess Corp., Pittsburgh Pa.), and the like, are heat-stable and do not demonstrate a significant change in color after the single heating step.

Conventionally, two types of color systems are used to visually observe and assess color changes in pigments included in a coating composition. The color systems have at least three dimensions, in order to include all possible colors, and can be based either on a specific arrangement of predetermined colors, or by identifying colors mathematically. The mathematical color system is the CIE color system and is based on mathematical description of the light source, objects and a standard observer. The light reflected or transmitted by an object is measured with a spectrophotometer or similar apparatus or instrument. The data can be mathematically reproduced as three-dimensional CIE color space. Color differences ($\Delta E$) are calculated using the $L^*a^*b^*$ equations, where $L^*$ represents lightness, $a^*$ represents redness-greenness and $b^*$ represents yellowness-blueness. The quantities on the $L^*a^*b^*$ scale are calculated using equations known in the art.

The color of a powder composition and the cured coating formed from the composition are measured using a coating spectrophotometer. Color difference $\Delta L$, $\Delta a$, and $\Delta b$ are preferably obtained by subtracting the $L^*a^*b^*$ scale values for the powder composition and the corresponding cured films.

The color change is numerically expressed as the number of units of color short on the $L^*$ scale ($\Delta L$), $a^*$ scale ($\Delta a$), or $b^*$ scale ($\Delta b$). In an aspect, $\Delta L$ ranges from 0 (black) to 100 (white), preferably 0.5 to 20 units, more preferably 2 to 15 units. In an aspect, $\Delta a$ ranges from −60 (green) to 60 (red), preferably a shift of 10 to 40 units on the scale, more preferably 15 to 35 units, and $\Delta b$ ranges from −60 (blue) to 60 (yellow), preferably a shift of 5 to 30 units on the scale, more preferably 10 to 25 units.

Accordingly, in an embodiment, the first and/or second powder composition includes one or more pigments that exhibit a large permanent color change on curing. The magnitude of the color change may be assessed in a variety of ways known in the art, including preferably using the $L^*a^*b^*$ color change system, as described above. In an aspect, the total color change ($\Delta E$) is denoted by a color shift that is easily observed by visual or instrumental means, such as with a spectrophotometer, for example. The color shift corresponds to a particular number of units on at least one axis of the $L^*a^*b^*$ scale.

Accordingly, in an embodiment, where the first and/or second coating composition(s) include(s) one or more pigments that change color at typical cure temperatures of the coating composition(s), the color change ΔE corresponds to a shift of at least about 1 unit, preferably at least about 5 units.

In an embodiment, the methods described herein include applying at least a second powder composition after at least a first powder composition has been applied on the metal substrate. In an aspect, the first powder composition is preferably identical or similar in color to the second powder composition, i.e. the second powder composition is critically color-matched to the first powder composition.

Accordingly, in an embodiment, the second powder composition is critically color-matched to the first powder composition. The color match of the first and second powder composition may be assessed in a variety of ways known in the art, including preferably using L*a*b* color change system, as described above. In an aspect, where the first and second coating composition are critically color-matched, the total color change ΔE corresponds to a shift of less than about 2 units, preferably less than about 1 unit, more preferably less than about 0.5 units.

Without limiting to theory, it is believed that corrosion resistance, including at the edges, and smoothness of a coating are related to flow. Typically and preferably, edge coverage improves edge corrosion resistance of a coated substrate, and low flow coatings are believed to provide improved edge coverage, i.e., edge coverage decreases as flow increases. Conversely, smoothness increases as flow increases. When only one powder composition is applied to a substrate, a low flow coating will provide good edge coverage but with low surface smoothness. On the other hand, if a high flow composition is used, high surface smoothness is achieved, but edge coverage is sacrificed. Therefore, in order to coat a metal substrate to provide optimal edge coverage and smoothness, it is preferable to vary the flow of the first and/or second powder coating composition.

The flow of a powder coating composition is dependent on various factors, including, without limitation, the viscosity of the binder resin(s), oil absorption of extender pigments, flow control agents, the ratio of extender pigments to resin used in the composition, the reactivity of the resin, and the like. Conventionally, the flow of a powder coating composition may be adjusted by altering the amount or type of extender pigment used, by altering the resin or crosslinker chemistry, or by introducing flow control agents (such as thixotropes, for example). For example, the flow of a powder composition may be reduced by inclusion of extender pigments having oil absorption of at least about 25 g/100 mL, preferably at least about 35 g/100 mL.

Accordingly, in an embodiment, the first powder composition and second composition are selected based on their relative flow, with flow adjusted or controlled by conventional means. In an aspect, the first powder composition is a low flow composition, and the second powder composition is a relatively high flow composition. The first powder composition has flow of no more than about 40 mm, preferably about 10 to 30 mm, more preferably about 15 to 25 mm. In another aspect, the second powder composition has flow of at least about 40 mm, preferably more than about 50 mm, more preferably more than about 70 mm.

Conventionally, substrates are coated with a low flow powder composition first and the coating is heated to melt and cure the composition. A second powder composition, typically a high flow composition, is then applied over the first coating and melted and cured. This produces a coating with good edge coverage and smoothness, but the process requires at least two application and heating steps, with a corresponding increase in production line space, time and energy costs.

In contravention of conventional practice and industry bias, the methods and systems described herein include steps for sequential application of a low flow powder composition and a high flow powder composition, but with a single heating step following the application of the second composition. Surprisingly, the single heating step produces a coating with excellent corrosion resistance, including at the edges, and optimal surface smoothness. In an aspect, the methods described herein produce edge coverage on the order of about 2%, preferably about 5%, more preferably about 10% of face coverage.

The flow of a coating represents the ability of the coating to wet a substrate, i.e. when a coating is applied to a substrate, the flow will determine how well the coating covers the substrate surface. The application of a coating with poor flow can therefore produce a coated surface with a non-uniform or rough texture. Over a given period of time, the coating will become less rough in a process known as leveling. Flow and leveling have significant influence on the performance and appearance characteristics of a coating. For example, inadequate flow of a coating leads to defects such as craters and pinholes as a result of the coating not completely covering the substrate. Incomplete coverage of the substrate as a result of inadequate flow also leaves parts of the substrate exposed and prone to corrosion, thereby affecting performance.

The flow and leveling of an applied powder coating are governed by viscosity and surface tension, with the appearance of a coating determined largely by viscosity and by the time available for leveling. The viscosity of an uncured powder compositions changes during cure. Initially, a powder composition will melt and flow over the substrate as the temperature increases beyond the glass transition temperature (Tg) of the composition and until the composition reaches its minimum viscosity. When the composition begins to cure, the viscosity will increase and therefore, the ability of the powder to flow and cover the substrate surface will decrease. The viscosity of a composition relates to its reactivity, and without limiting to theory, a highly reactive composition may never reach its minimum viscosity and therefore never demonstrate adequate flow. Therefore, it is important to balance viscosity and the reactivity of a composition in order to control flow. Conventionally, the flow of a powder is lowest when the minimum viscosity of the powder composition is highest. The high minimum viscosity limits the composition from flowing over the surface, and if not optimized, leads to voids or pinholes in the cured coating.

Without limiting to theory, it is believed that surface tension affects the ability of a powder composition to wet a substrate. If surface tension is too high, poor wetting occurs, and defects such as craters are formed where the powder cannot flow over the substrate. On the other hand, if surface tension is too low, other defects such as sagging and poor edge coverage will be seen. Without limiting to theory, surface tension and viscosity also influence the leveling behavior of a composition. Therefore, to obtain a coating with optimized flow and leveling, acceptable levels of air entrainment and final appearance, it is necessary to balance the viscosity, surface tension and reactivity or cure behavior of the composition.

Conventionally, when two or more powder coating compositions are applied to a substrate, each layer is cured individually before the next layer is applied. As a result, it is possible to control the flow and leveling of each layer independently in order to obtain a coating with optimal appearance and performance characteristics. However, in the methods described herein, two or more layers of powder composition are applied to a substrate with only a single curing step, and therefore, the rheological and kinetic properties of the coating composition must be controlled to provide optimal appearance and performance characteristics. Accordingly, the powder coating compositions described herein have been modified to have a combination of leveling, viscosity and reactivity that leads to a system with optimal performance in environmental testing, mechanical testing, and appearance.

Conventionally, for a low flow product, a binder resin with a high viscosity (i.e. at least 3000 Pa, preferably about 3000 to 5000 Pa-s) is used along with flow control agents to adjust the viscosity of the ultimate coating composition. However, such low flow compositions often demonstrate poor wetting and outgassing relative to conventional high flow compositions. In contravention of conventional practice, the methods and systems described herein use a low flow coating composition with low viscosity for the first coating composition. Surprisingly, the low viscosity composition produces a coating with excellent flow and wetting characteristics, i.e. comparable to a conventional high flow composition, with minimal film or surface defects. Furthermore, the low flow, low viscosity compositions described herein produce films effective in outgassing, comparable to conventional high flow compositions.

Accordingly, in an embodiment, the first coating composition is a low flow composition, and the second powder composition is a relatively high flow composition. The first powder composition has viscosity almost four times greater than the viscosity of the second composition. This difference in viscosities will provide optimal edge coverage along with acceptable surface flow and leveling for the first coating, while the high flow of the second coating composition will produce a high gloss smooth surface.

The flow and leveling characteristics of the first and second compositions must therefore be carefully balanced to obtain a powder coating with optimal performance and aesthetic appearance. However, it is not possible to obtain a coating with the required performance or appearance by simply blending the first and second compositions, as such a blend will tend to have the flow characteristics of the component present at higher concentration. For example, a blend of a low flow composition (15%) and a high flow composition (85%) will have flow index similar to a high flow composition, and therefore, the blend will not have the necessary performance characteristics.

The coating as described herein is formed only when a first and second coating composition are independently applied to a substrate and cured simultaneously. This process of applying two coatings with a single cure step provides unique challenges with respect to flow and leveling. For instance, if the first composition has a high viscosity and slow cure behavior, any entrapped air will take a longer time to leave the coating. If the second composition has low viscosity and fast cure behavior, the low viscosity helps the second composition remove entrapped air. Where only a single curing step is used and the first and second coatings are cured simultaneously, the coating will include a first layer that is not cured with a second layer that is fully cured, and entrapped air will be present between the layers. Therefore, controlling the flow, leveling and cure characteristics of each composition is of critical importance.

In an aspect, the methods described herein produce optimal surface smoothness. The methods described herein produce surface smoothness on the PCI scale of at least 4, preferably at least 5. Measured as 20-degree gloss, using the method set out in ASTM D523, the methods described herein produce surface smoothness of about 25 to 90%, preferably above 60% of the specular reflectance of a reference black glass standard. Typically and preferably, the smoothness of the surface will be determined by the desired end use for the powder-coated metal substrate.

In an embodiment, the first or second powder composition includes at least one polymeric binder. The powder composition may also optionally include one or more pigments, opacifying agents or other additives.

Suitable polymeric binders generally include a film forming resin and optionally a curing agent for the resin. The binder may be selected from any resin or combination of resins that provides the desired film properties. Suitable examples of polymeric binders include thermoset and/or thermoplastic materials, and can be made with epoxy, polyester, polyurethane, polyamide, acrylic, polyvinylchloride, nylon, fluoropolymer, silicone, other resins, or combinations thereof. Thermoset materials are preferred for use as polymeric binders in powder coating applications, and epoxies, polyesters and acrylics are preferred. If desired, elastomeric resins may be used for certain applications. In an aspect, specific polymeric binders or resins are included in the powder compositions described herein depending on the desired end use of the powder-coated substrate. For example, certain high molecular weight polyesters show superior corrosion resistance and are suitable for use on substrates used for interior and exterior applications.

In an aspect, the first and second powder compositions include the same polymeric binder. In another aspect, the first and second powder compositions include different polymeric binders. Examples of preferred binders include the following: carboxyl-functional polyester resins cured with epoxide-functional compounds (e.g., triglycidyl-isocyanurate or TGIC), carboxyl-functional polyester resins cured with polymeric epoxy resins, carboxyl-functional polyester resins cured with hydroxyalkyl amides (HAA), hydroxyalkyl urea (HAU), hydroxyl-functional polyester resins cured with blocked isocyanates or uretdiones, epoxy resins cured with amines (e.g., dicyandiamide), epoxy resins cured with phenolic-functional resins, epoxy resins cured with carboxyl-functional curatives, carboxyl-functional acrylic resins cured with polymeric epoxy resins, hydroxyl-functional acrylic resins cured with blocked isocyanates or uretdiones, unsaturated resins cured through free radical reactions, and silicone resins used either as the sole binder or in combination with organic resins. The optional curing reaction may be induced thermally, or by exposure to radiation (e.g., UV, UV-vis, visible light, IR, near-IR, and e-beam).

In an embodiment, the powder compositions are heated to the typical cure or melt temperatures of the compositions, i.e. about 110° C. to about 250° C., preferably 120° C. to 200° C.

In order for a powder coating composition to be effective, the composition must be resistant to sintering or substantially non-sintering, i.e. the powder composition must retain its particulate characteristics even when exposed to specific conditions. The sintering resistance of a powder composition is typically maintained by using compositions having a Tg of 45° C. or higher. Conventionally, these compositions are cured at temperatures of about 180° C. to about 250° C., or even at lower temperatures of about 140° C. to 170° C.

However, high Tg compositions may not demonstrate optimum coalescing or leveling when cured at reduced temperatures less than about 140° C., resulting in poor film formation and inadequate mechanical properties. Conventionally, therefore, powder coatings which are intended for reduced temperature cure are generally formulated with resins having reduced Tg, resulting in increased tendency for the powder coating to sinter and create lumps during storage. Without limiting to theory, by selecting polymeric binder resins with transition temperature (Tg) of at least 50° C., more preferably about 55° C. to 70° C., and most preferably about 60° C. to 65° C., a powder coating composition capable of cure at low temperatures of 120° C. to 135° C. can be made without any problems with coalescing or sintering typically expected at high Tg. Such coatings are described as ultra-low cure powder compositions, and are described in Applicant's Application No. PCT/US2013/025302, filed Feb. 8, 2013, now published as WO2014123534.

The first or second powder composition may include other additives. These other additives can improve the application of the powder coating, the melting and/or curing of that coating, or the performance or appearance of the final coating. Examples of optional additives which may be useful in the powder include: cure catalysts, antioxidants, color stabilizers, slip and mar additives, UV absorbers, hindered amine light stabilizers, photoinitiators, conductivity additives, tribocharging additives, anti-corrosion additives, fillers, texture agents, degassing additives, flow control agents, thixotropes, and edge coverage additives.

The polymeric binder is dry mixed together with any additives, and then is typically melt blended by passing through an extruder. The resulting extrudate is solidified by cooling, and then ground or pulverized to form a powder. Other methods may also be used. For example, one alternative method uses a binder that is soluble in liquid carbon dioxide. In that method, the dry ingredients are mixed into the liquid carbon dioxide and then sprayed to form the powder particles. If desired, powders may be classified or sieved to achieve a desired particle size and/or distribution of particle sizes.

The resulting powder is at a size that can effectively be used by the application process. Practically, particles less than 10 microns in size are difficult to apply effectively using conventional electrostatic spraying methods. Consequently, powders having median particle size less than about 25 microns are difficult to electrostatically spray because those powders typically have a large fraction of small particles. Preferably the grinding is adjusted (or sieving or classifying is performed) to achieve a powder median particle size of about 25 to 150 microns, more preferably 30 to 70 microns, most preferably 30 to 50 microns.

Optionally, other additives may be used in the present invention. As discussed above, additives may be added prior to extrusion and be part of the base powder, or may be added after extrusion. Suitable additives for addition after extrusion include materials that would not perform well if they were added prior to extrusion; materials that would cause additional wear on the extrusion equipment, or other additives.

Additionally, optional additives include materials which are feasible to add during the extrusion process, but may also be added later. The additives may be added alone or in combination with other additives to provide a desired effect on the powder finish or the powder composition. These other additives can improve the application of the powder, the melting and/or curing, or the final performance or appearance. Examples of optional additives which may be useful include: cure catalysts, antioxidants, color stabilizers, slip and mar additives, UV absorbers, hindered amine light stabilizers, photoinitiators, conductivity additives, tribocharging additives, anti-corrosion additives, fillers, texture agents, degassing additives, flow control agents, and the like.

In a preferred embodiment, the compositions described herein include additives that improve the electrostatic application characteristics of the powder coating compositions. Suitable additives of this type include, for example, extrudable application additives, fumed metal oxides, combinations thereof, and the like. In an aspect, the application additive is added to the raw material before extrusion, and other additives such as the metal oxide, for example, can be added later, during grinding or pulverization of the composition. Additives of this type are further described in Applicant's co-pending International Application No. PCT/US2013/030506, filed Mar. 12, 2013.

Other preferred additives include performance additives such as rubberizers, friction reducers, and microcapsules. Additionally, the additive could be an abrasive, a heat sensitive catalyst, an agent that helps create a porous final coating, or that improves wetting of the powder.

Techniques for preparing low flow and high flow powder compositions are known to those of skill in the art. Mixing can be carried out by any available mechanical mixer or by manual mixing. Some examples of possible mixers include Henschel mixers (available, for example, from Henschel Mixing Technology, Green Bay, Wis.), Mixaco mixers (available from, for example, Triad Sales, Greer, S.C. or Dr. Herfeld GmbH, Neuenrade, Germany), Marion mixers (available from, for example, Marion Mixers, Inc., 3575 3rd Avenue, Marion, Iowa), invertible mixers, Littleford mixers (from Littleford Day, Inc.), horizontal shaft mixers and ball mills. Preferred mixers would include those that are most easily cleaned.

Powder coatings are generally manufactured in a multi-step process. Various ingredients, which may include resins, curing agents, pigments, additives, and fillers, are dry-blended to form a premix. This premix is then fed into an extruder, which uses a combination of heat, pressure, and shear to melt fusible ingredients and to thoroughly mix all the ingredients. The extrudate is cooled to a friable solid, and then ground into a powder. Depending on the desired coating end use, the grinding conditions are typically adjusted to achieve a powder median particle size of about 25 to 150 microns.

The final powder may then be applied to an article by various means including the use of fluid beds and spray applicators. Most commonly, an electrostatic spraying process is used, wherein the particles are electrostatically charged and sprayed onto an article that has been grounded so that the powder particles are attracted to and cling to the article. Typically, a corona charging process is used for electrostatic application, although tribo charging or a combination of corona and tribo charging may be used. After coating, the article is heated. This heating step causes the powder particles to melt and flow together to coat the article. Optionally, continued or additional heating may be used to cure the coating. Other alternatives such as UV curing of the coating may be used.

The coating is optionally cured, and such curing may occur via continued heating, subsequent heating, or residual heat in the substrate. In another embodiment of the invention, if a radiation curable powder coating base is selected, the powder can be melted by a relatively short or low temperature heating cycle, and then may be exposed to radiation to initiate the curing process. One example of this embodiment is a UV-curable powder. Other examples of radiation curing include using UV-vis, visible light, near-IR, IR, and e-beam.

The compositions and methods described herein may be used with a wide variety of substrates. Typically and preferably, the powder coating compositions described herein are used to coat metal substrates, including without limitation, unprimed metal, clean-blasted metal, and pretreated metal, including plated substrates and ecoat-treated metal substrates. Typical pretreatments for metal substrates include, for example, treatment with iron phosphate, zinc phosphate, and the like. Metal substrates can be cleaned and pretreated using a variety of standard processes known in the industry. Examples include, without limitation, iron phosphating, zinc phosphating, nanoceramic treatments, various ambient temperature pretreatments, zirconium containing pretreatments, acid pickling, or any other method known in the art to yield a clean, contaminant-free surface on a substrate.

The coating compositions and methods described herein may be, but are not limited to conversion coatings, i.e. parts or surfaces where the substrate is converted into a coating by a chemical or electrochemical process. The coating compositions described herein may be applied to substrates previously coated by various processes known to persons of skill in the art, including for example, ecoat methods, plating methods, and the like. For example, for many applications, the substrate may be pretreated and then coated by an electrocoat process to produce a primed substrate. The powder coating compositions described herein are then applied over the ecoat-primed substrate.

There is no expectation that substrates to be coated with the compositions described herein will always be bare or unprimed metal substrates. In an embodiment, the methods described herein may be used to spray the entire substrate. In another embodiment, the methods described herein may be used to spray only the edges of the substrate. Preferably, the coated substrate has desirable physical and mechanical properties, including optimal edge coverage of sharp edges and surface smoothness. Typically, the final film coating will have a thickness of 20 to 200 microns, preferably 75 to 150 microns.

The following examples are offered to aid in understanding of the present invention and are not to be construed as limiting the scope thereof. Unless otherwise indicated, all parts and percentages are by weight.

EXAMPLES

Unless indicated otherwise, the following test methods were utilized in the Example(s) that follow(s).
Melt Flow Measurement
The melt flow of the powder compositions is tested using ASTM D3451 (Standard Guide for Testing Coating Powders and Powder Coatings).
Edge Coverage
The edge coverage of the powder coatings is tested using the method described in ASTM D2967 (Standard Test Method for Corner Coverage of Powder Coatings).
Smoothness
The surface smoothness of the coating is measured as 20-degree gloss using the procedure described ASTM D523 (Standard Test Method for Specular Gloss).

Example 1

Comparison of Coating Types

Powder compositions were prepared as indicated in Table 1 and applied to 0.020-in (0.05 cm) thick cold-rolled steel panels. The total coating thickness for each coating in Table 1 (whether single-layer or dual-layer) was about 75-90 microns (3.0 to 3.6 mil). Flow, edge coverage, and smoothness for each coating type were then measured.

TABLE 1

| Type | Coating | Flow (mm) | Edge Coverage (%) | 20-degree Gloss (%) |
| --- | --- | --- | --- | --- |
| Composition #1 | Low Flow | 21 | 14 | 45 |
| Composition #2 | High Flow | 78 | 1.0 | 92 |
| Comparative (low flow primer and high flow topcoat) | Two cure | N/A | 6.6 | 85 |
| Inventive (low flow primer and high flow topcoat) | Single cure | N/A | 2.4 | 81 |

Example 2

Edge Coverage and Smoothness as Function of Flow

Panels were prepared as described in Example 1, except that only a single powder composition is applied, with the composition selected according to the flow shown in Table 2. Edge coverage and smoothness are then determined for each panel.

TABLE 2

| Coating Flow (mm) | Edge Coverage (%) | 20-degree Gloss (%) |
| --- | --- | --- |
| 19 | 21.8 | 27 |
| 21 | 14.3 | 45 |
| 23 | 12.2 | 50 |
| 29 | 7.4 | 58 |
| 34 | 5.5 | 57 |
| 39 | 2.9 | 74 |
| 78 | 1.0 | 92 |

As can be seen from Table 2, a coating with a flow of less than about 40 provides acceptable edge coverage while a coating with a flow of above about 40 provides optimal surface smoothness.

Example 3

Preparation and Measurement of Colored Powder Coating Compositions

Commercially available powder coatings (#1 to #9) were obtained (Valspar Corp., Minneapolis Minn.). In addition, powder coating compositions were prepared as indicated in Table 5 (#10 and #11; comparative) and Table 6 (#12 to #15; exemplary). Each composition included 850 parts by weight D.E.R. 6224 epoxy resin (Dow Chemical Co., Midland Mich.), 150 parts of an imidazole-catalyzed phenolic curing agent KD-404J (Kukdo Chemical Co., Seoul, Korea), and 18 parts of flow control agent Resiflow PF-67 (Estron Chemical Co., Calvert City Ky.). In addition, each composition included pigments of the type and amount shown in Tables 1 and 2. The components of each composition were blended in plastic bags, melt-blended through a twin-screw extruder and cooled to solidify. The cooled compositions were then ground to a coating composition, with oversized particles removed by sieving through an 80-mesh (0.0070 in) screen. For each composition, color was measured by pouring the composition at least 0.1 in deep on a steel panel. Clear colorless packing tape was applied to confine the powder composition to a blister-shaped area. The color of the powder blister was measured using a spectrophotometer.

TABLE 3

Comparative Compositions

| Pigment | #10 (parts by weight) | #11 (parts by weight) |
|---|---|---|
| White R-900 | 100 | 100 |
| Yellow L1100 | 0 | 10 |

TABLE 4

Exemplary Compositions

| Pigment | #12 | #13 | #14 | #15 |
|---|---|---|---|---|
| White R-900 | 100 | 50 | 100 | 41 |
| Yellow L1100 | 0 | 30 | 0 | 1.4 |
| Colortherm 10 | 0 | 0 | 0 | 94 |
| Hansa Red GG | 10 | 20 | 0 | 0 |
| Novaperm Red HF3S 70 | 0 | 0 | 10 | 10 |

Example 4

Preparation and Measurement of Coating Films

The powder compositions of Example 3 were applied to 0.32 in-thick grounded steel panels using electrostatic spray methods. Coated panels were cured at 400° F. and allowed to cool to room temperature. The resultant coating films were 2.8 to 3.2 mil (0.07 to 0.08 mm) in thickness. The color of the cured films was measured using a coating spectrophotometer. Color differences ΔL, Δa, and Δb were obtained by subtracting measured color values for powders and corresponding cured films. Results are shown in Tables 3 and 4.

TABLE 5

Color Change for Comparative Compositions

| | Visual Color Change | | Numerical Color Change (Powder to Film) | | |
|---|---|---|---|---|---|
| | Powder | Film | ΔL | Δa | Δb |
| 1 | Bright Blue | Dark Blue | −12.2 | 11.1 | 8.5 |
| 2 | Black | Black | −2.7 | −0.5 | −1.1 |
| 3 | White | White | −1.5 | −0.1 | −2.1 |
| 4 | Beige | Beige | −0.4 | 0.3 | −0.4 |
| 5 | Yellow | Yellow | −3.3 | 0.7 | −6.4 |
| 6 | Orange | Orange | −5.7 | −3.4 | −7.0 |
| 7 | Red | Red | −3.5 | −11.1 | −2.5 |
| 8 | Bright Green | Dark Green | −9.9 | 11.4 | −5.2 |
| 9 | Brown-shade Yellow | Brown-shade Yellow | −4.8 | 0.7 | 2.17 |
| 10 | White | Off-white | −9.7 | −1.3 | 6.9 |
| 11 | Yellow | Yellow | −7.8 | 1.8 | −2.0 |

TABLE 6

Color Change for Exemplary Compositions

| | Visual Color Change | | Numerical Color Change (Powder to Film) | | |
|---|---|---|---|---|---|
| Example | Powder | Film | ΔL | Δa | Δb |
| 12 | Orange | Off-white | 4.0 | −31.6 | −11.4 |
| 13 | Orange | Yellow | −2.5 | −35.0 | −9.5 |
| 14 | Red | Off-white | 12.1 | −37.7 | 7.7 |
| 15 | Orange | Brown-shade Yellow | 0.9 | −15.0 | 6.1 |

Example 5

Preparation and Measurement of Powder Rheological Behavior with Temperature

A representative sample of a primer and topcoat formulation (as shown in Table 5, for example) were each examined to compare their rheological behavior, with a blend of the topcoat and primer formulation (85% topcoat, 15% primer) used for comparison. The time and temperature dependence of the viscosity was measured on a strain-controlled rheometer using parallel plate geometry in dynamic mode, with an applied strain of 1% and 1 Hz frequency of oscillation. The data is represented as complex viscosity (Pa-s). For the primer and topcoat formulations, sample discs were prepared by compressing 0.3 g of the powder composition in a 13-mm plug mold at 1000 ram force for 15 seconds. Pressing was done at room temperature to avoid premature curing of the powder. The rheometer was set at 70° C. for sample loading. The gap was then set to 0.05 mm below the thickness of the pressed pellet to ensure contact with parallel plates. The temperature of the sample and fixtures were equilibrated for 10 minutes before measurements were taken. The sample temperature was ramped at 5° C./min from 70° C. to 245° C. to examine the rheological behavior as a function of temperature. The resultant curve of complex viscosity versus temperature is examined to compare the flow behavior of the powder compositions.

What is claimed is:

1. A method, comprising:
   providing a metal substrate;
   applying a primer coating comprising a first powder coating composition including a carboxyl-functional polyester binding resin, wherein the first powder coating composition has flow of no more than about 40 mm;
   applying a topcoat comprising a second powder coating composition with flow of at least about 40 mm; and
   heating the metal substrate with the primer coating and topcoat applied thereon in a single step, without multiple heating cycles, to form a continuous corrosion-resistant coating with 20-degree gloss of at least 50%.

2. The method of claim 1, wherein the first coating composition has a flow of about 15 mm to 40 mm.

3. The method of claim 1, wherein the first coating composition has a flow of about 20 to 35 mm.

4. The method of claim 1, wherein the second coating composition has flow of greater than about 50 mm.

5. The method of claim 1, wherein the second coating composition has flow of greater than about 70 mm.

6. The method of claim 1, wherein the second coating composition has flow of greater than about 75 mm.

7. The method of claim 1, wherein the cured coating has edge coverage equal to at least 2% of face coverage.

8. The method of claim 1, wherein the cured coating has edge coverage equal to about 10% of the face coverage.

9. The method of claim 1, wherein the metal substrate is unprimed, clean blasted, or pretreated.

10. The method of claim 1, wherein the first coating composition and second coating composition are heated in a single step at a temperature of about 180° C. to 200° C.

11. The method of claim 1, wherein the first coating composition and second coating composition are heated in a single step at a temperature of about 140° C. to 170° C.

12. The method of claim 1, wherein the first coating composition and second coating composition are heated in a single step at a temperature of about 120° C. to 135° C.

13. The method of claim 1, wherein the first coating composition is applied only to one or more edges of the substrate.

14. The method of any claim 1, wherein the second coating composition is applied only to one or more edges of the substrate.

15. The method of claim 1, wherein the first coating composition and the second coating composition are applied only to one or more edges of the substrate.

16. The method of claim 1, wherein the first coating composition is applied at a film build of about 20 to 40 micron.

17. The method of claim 1, wherein the second coating composition is applied at a film build of about 25 to 35 micron.

* * * * *

UNITED STATES PATENT AND TRADEMARK OFFICE
CERTIFICATE OF CORRECTION

PATENT NO. : 9,751,107 B2
APPLICATION NO. : 14/522143
DATED : September 5, 2017
INVENTOR(S) : Decker et al.

It is certified that error appears in the above-identified patent and that said Letters Patent is hereby corrected as shown below:

In the Specification

Column 3, Line 1 should read:
The method used to determine smoothness will typically depend on the ultimate end use for the powder-coated substrate.

Column 4, Line 19 should read:
Accordingly, in some embodiments, the present invention provides methods or systems for coating a substrate, including at the edges, with a process that uses a single heating step.

Column 4, Line 27 should read:
Therefore, the methods described herein reduce the time, energy and cost of powder coating a substrate, including at the edges, without compromising corrosion resistance or surface smoothness of the coating.

Column 4, Line 34-35 should read:
The powder is applied using methods known to those of skill in the art, such as, for example, electrostatic spray methods, to a film thickness of about 10 to about 100 microns, preferably 25 to 75 microns.

Column 4, Line 61 should read:
The total thickness of the film formed by the first and second powder compositions may be about 20 to 200 microns, preferably 50 to 150 microns (approx. 3.0 to 6.0 mil).

Column 4, Line 67 should read:
Without limiting to theory, particles of the first powder composition melt to a low flow liquid that remains where deposited, including on the edges of the substrate, and forms the metal interface.

Signed and Sealed this
Tenth Day of April, 2018

Andrei Iancu
*Director of the United States Patent and Trademark Office*

CERTIFICATE OF CORRECTION (continued)
U.S. Pat. No. 9,751,107 B2

Column 5, Line 11 should read:
Therefore, the first coating composition is applied at a greater thickness than the second coating composition to account for the altered profile of the substrate.

Column 5, Line 31 should read:
For example, where the marker is a UV-sensitive component, the substrate with the first powder already applied may be illuminated with a black light.

Column 6, Line 41 should read:
Color differences $\Delta L$, $\Delta a$, and $\Delta b$ are preferably obtained by subtracting the L*a*b* scale values for the powder composition and the corresponding cured films.

Column 6, Line 45 should read:
The color change is numerically expressed as the number of units of color shift on the L* scale ($\Delta L$), a* scale ($\Delta a$), or b* scale ($\Delta b$).

Column 7, Line 16 should read:
The color match of the first and second powder composition may be assessed in a variety of ways known in the art, including preferably using the L*a*b* color change system, as described above.

Column 9, Line 34 should read:
The first powder composition has a viscosity of almost four times greater than the viscosity of the second composition.